United States Patent
Gao et al.

(10) Patent No.: US 9,444,787 B2
(45) Date of Patent: Sep. 13, 2016

(54) NON-INTRUSIVE METHOD AND APPARATUS FOR AUTOMATICALLY DISPATCHING SECURITY RULES IN CLOUD ENVIRONMENT

(75) Inventors: Bo Gao, Beijing (CN); Steven D. Ims, Apex, NC (US); Ling Lan, Beijing (CN); Jason R. McGee, Apex, NC (US); Li Yi, Beijing (CN); Yu Zhang, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 222 days.

(21) Appl. No.: 14/353,053

(22) PCT Filed: Sep. 12, 2012

(86) PCT No.: PCT/CN2012/081274
§ 371 (c)(1),
(2), (4) Date: Sep. 8, 2014

(87) PCT Pub. No.: WO2013/060203
PCT Pub. Date: May 2, 2013

(65) Prior Publication Data
US 2015/0033285 A1   Jan. 29, 2015

(30) Foreign Application Priority Data
Oct. 24, 2011  (CN) .......................... 2011 1 0324588

(51) Int. Cl.
*H04L 29/00*   (2006.01)
*H04L 29/06*   (2006.01)
(Continued)

(52) U.S. Cl.
CPC ......... *H04L 63/0263* (2013.01); *G06F 21/552* (2013.01); *H04L 63/0218* (2013.01); *H04L 63/1466* (2013.01); *H04L 67/02* (2013.01); *H04L 67/10* (2013.01)

(58) Field of Classification Search
CPC . H04L 63/0263; H04L 63/102; H04L 63/20; G06F 21/6218; G06F 9/45558; G06F 2009/45587
See application file for complete search history.

(56) References Cited

U.S. PATENT DOCUMENTS

| | | |
|---|---|---|
| 6,119,230 A | 9/2000 | Carter |
| 6,950,825 B2 | 9/2005 | Chang |

(Continued)

FOREIGN PATENT DOCUMENTS

| | | |
|---|---|---|
| CN | 201717894 U | 1/2011 |
| CN | 102111420 A | 6/2011 |
| CN | 102045353 A | 6/2013 |

OTHER PUBLICATIONS

Anand et al., "Application Commerce: Security Challenges and Workflows" Dept. of Electr. & Comput. Eng., Illinois Inst. of Tech., May 2011, p. 1-6, Chicago, IL.

(Continued)

*Primary Examiner* — Jeffrey Pwu
*Assistant Examiner* — Helai Salehi
(74) *Attorney, Agent, or Firm* — Scully Scott Murphy and Presser

(57) ABSTRACT

The present invention relates to a non-intrusive method and apparatus for automatically dispatching security rules in a cloud environment. The method comprises: forming a composition application model of an application in the cloud environment, said composition application model including at least types of various servers for deploying said application; generating a topology model of said various servers in the cloud environment; automatically generating security rules to be adopted by the server-side firewalls of respective servers based on the application context of said application, said composition application model and said topology model; and dispatching said security rules to each server-side firewall based on said composition application model and topology model.

14 Claims, 10 Drawing Sheets

(51) Int. Cl.
*G06F 21/55* (2013.01)
*H04L 29/08* (2006.01)

(56) References Cited

U.S. PATENT DOCUMENTS

| | | | |
|---|---|---|---|
| 7,363,650 B2 | 4/2008 | Moriconi | |
| 8,640,195 B2 | 1/2014 | Choi et al. | |
| 2009/0228967 A1 | 9/2009 | Gbadegesin | |
| 2011/0072486 A1* | 3/2011 | Hadar | G06F 21/6218 |
| | | | 726/1 |
| 2012/0185913 A1* | 7/2012 | Martinez | G06F 9/455 |
| | | | 726/1 |

OTHER PUBLICATIONS

Chen et al., "Shelp: Automatic Self-Healing for Multiple Application Instances in a Virtual Machine Environment," Cluster & Grid Comp Lab., Huazhong Univ., 2010, p. 97-106, CH.
Lang, Ulrich, "Model-Driven Cloud Security", developerWorks—IBM, Feb. 2011, pp. 1-17.
Wobber et al., "Policy-Based Access Control for Weakly Consistent Replication," Microsoft Research Tech. Report, MSR-TR-2009-15, Feb. 2009, p. 1-14.
Wysopal, Chris, "Navigating Cloud Application Security: Myths vs. Realities", Cloud Security Alliance Industry Blog, Mar. 2011.

* cited by examiner

```
                    Method      URL Template                                                                                                              Version POST http://chinabank.com:8080/Account/transferMoney.php HTTP/1.0
Accept: image/gif, image/x-xbitmap, image/jpeg
Referer: http://9.186.54.51:8080/MyBankApp/request.jsp
Accept-Language: zh-cn,en-us;q=0.5
Content-Type: application/x-www-form-urlencoded
Proxy-Connection: Keep-Alive                              Header contains Parameters in Name-Value pair
User-Agent: Mozilla/4.0 (compatible; MSIE 6.0;
    Windows NT 5.1; SV1; .NET CLR 2.0.50727;
    .NET CLR 3.0.04506.648; .NET CLR 3.5.21022; CIBA)
Host: 9.186.54.51:8080
Content-length: 19
Pragma: no-cache
Cookie: JSESSIONID=29D07EE24B69CC4C4173F9AFBF87A6A
                                                          Cookie contains Parameters
acct=BOB&amount=100    Body contains Parameters
```

FIG. 4

NON-INTRUSIVE METHOD AND APPARATUS FOR AUTOMATICALLY DISPATCHING SECURITY RULES IN CLOUD ENVIRONMENT

CROSS-REFERENCE TO RELATED APPLICATIONS

This application claims priority under 35 U.S.C. §371 from PCT Application, PCT/CN92012/081274, filed on Sep. 12, 2012, which claims priority from the Chinese Patent Application No. 201110324588.2, filed on Oct. 24, 2011. The entire contents of both applications are incorporated herein by reference.

TECHNICAL FIELD

The present invention generally relates to a field of network security. More specifically, the present invention relates to a non-intrusive method and apparatus for automatically dispatching (and updating) security rules in cloud environment.

DESCRIPTION OF THE RELATED ART

With the development of the computer and Internet technologies, Web applications such as Internet shopping have become popular. Client-side scripts (e.g. JavaScript) are generally used in these applications to improve user's experience. However, the accompanying security problems increase. At present, the number of security vulnerabilities of Web applications is increasing rapidly. Web applications are susceptible to Cross-Site Scripting (XSS), Cross-Site Request Forgery (CSRF), SQL injection, LDAP injection, command injection, PHP injection, and etc. Statistics shows that 90% of sites are susceptible to network application attacks.

For example, XSS attack is a typical example of a network application attack. XSS attack means that an attacker embeds a malicious script in a link that seems to be from a trustable source so that embedded malicious script is sent to the client of a user for executing (e.g., stealing the user's sensitive information) when the user clicks the link. When used together with Asynchronous JavaScript and XML (AJAX), XSS attack is able to send a malicious request in the name of the victim without refreshing of a new webpage, which makes this attack more hidden and dangerous. The above-mentioned other malicious attacks are substantially similar to XSS in that they inject malicious codes or scripts into Web application servers to attack, which will not be described here in detail.

In order to prevent such attacks, user's input (e.g., a HTTP request) needs to be validated on the side of a Web application server (e.g., WebSphere Application Server, WAS). A Web Application Firewall (WAF) that is a transparent protection mechanism applied on the side of the Web application server is configured to perform such validation. The Web application firewall has at least the following functions: validating a user's input based on predefined security rules; regarding a user's input that violates security rules, taking a suitable security protection action, e.g., blocking IP, denying request, generating a log or rewriting payload.

For the server-client mode, security rules are simply set for the Web application firewall applied on the side of the Web application server. However, in a cloud environment, because of diverse configuration and deployment, it becomes more complicated to provide application security protection against XSS, SQL injection, etc. In a cloud environment, for the deployment of applications, there are diverse and dynamic topologies:

1) Based on a defined composition application model, each application can be deployed on a plurality of servers;
2) In build time, security rules for an application should be applied to all the servers on which the application is deployed.

FIG. 1 illustrates an example in which applications are deployed in a plurality of servers in cloud environment.

In the prior art, in cloud environment, security rules need to be individually configured for each server in which the same application is deployed, which is very troublesome and time-consuming.

SUMMARY OF THE INVENTION

Based on the above technical problems, an effective method and apparatus capable of simplifying the configuration of security rules for respective servers by an administrator in a cloud environment is needed.

A method and an apparatus according to the present invention can automatically generate security rules for an application and dispatch them to a plurality of servers on which the application is deployed, so as to satisfy the complexity requirements in the diverse cloud environment. For the deployed application, code modification is not needed so that it is transparent to the existing applications. The method and the apparatus according to the present invention can reduce the burden of configuring security rules for a plurality of servers.

In order to solve the above problems, according to one embodiment of the present invention, there is provided a non-intrusive method for automatically dispatching security rules in cloud environment, comprising the steps of: forming a composition application model of an application in the cloud environment, said composition application model including at least types of various servers for deploying said application; generating a topology model of said various servers in the cloud environment; automatically generating security rules to be adopted by the server-side firewalls of respective servers based on the application context of said application, said composition application model and said topology model; and dispatching said security rules to each server-side firewall based on said composition application model and topology model.

According to another embodiment of the present invention, there is provided a non-intrusive apparatus for automatically dispatching security rules in a cloud environment, comprising: a composition application model forming means for forming a composition application model of an application in the cloud environment, said composition application model including at least types of various servers for deploying said application; a topology model generating means for generating a topology model of said various servers in the cloud environment; a security rule generating means for automatically generating security rules to be adopted by the server-side firewalls of respective servers based on the application context of said application, said composition application model and said topology model; and a security rule dispatching means for dispatching said security rules to each server-side firewall based on said composition application model and topology model.

In addition, in another embodiment, based on feedback information provided from Web application firewalls, security rules can be updated. The updated security rules are dispatched again to the plurality of servers, in order to be suitable for diverse and dynamic topology structures in the cloud environment. By applying the technical solution, if vulnerability is found in one server in runtime, rules against the vulnerability are rapidly dispatched to all servers on which the same application is deployed.

BRIEF DESCRIPTION OF THE DRAWINGS

The present invention itself and preferred modes, other objects and advantages thereof will be better understood by reading the following detailed description of illustrative embodiments with reference to drawings in which:

FIG. 4 illustrates an example of an HTTP request;

Figure 1:
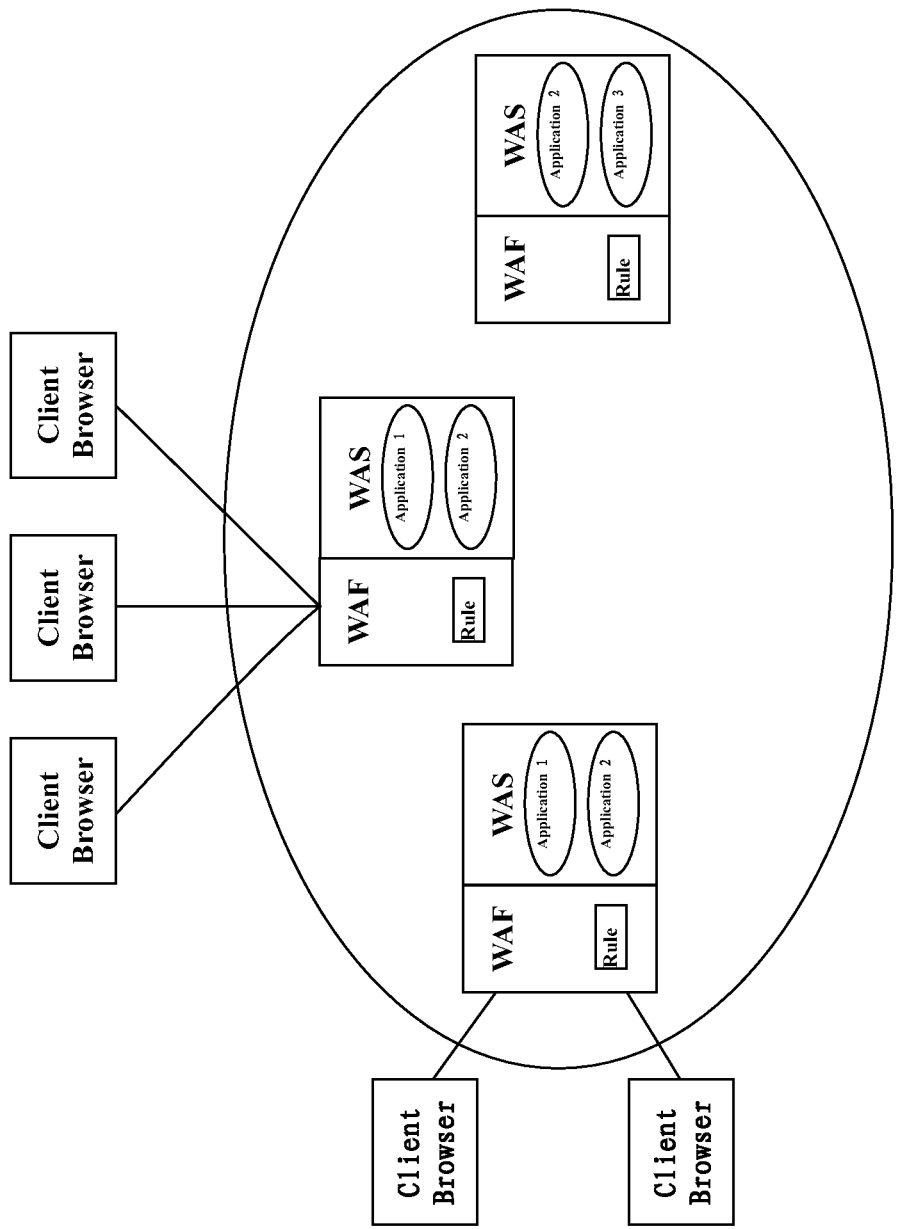
FIG. 1 illustrates an example of a case in which applications are deployed in a plurality of servers in cloud environment.

Now, preferred methods and systems are described with reference to drawings wherein like reference numbers are used to indicate like elements in the drawings. In the following description, for an explanatory purpose, many specific details are set forth in order to help fully understand systems and methods, etc. In other examples, in order to simplify the description, commonly used structures and devices are illustrated in a form of block diagram. Many modifications and other embodiments may be conceived of by those skilled in the art, which own the benefits taught in the specification and drawings as well. Therefore, it should be understood that the present invention is not limited to the disclosed specific embodiments, and additional possible embodiments should be contained in the scope and exemplary inventive concept of the present invention. Although some specific terms are used herein, they are simply used in a general descriptive sense but not for a limiting purpose.

DETAILED DESCRIPTION OF THE PREFERRED EMBODIMENT

Specific embodiments of the present invention will be explained in detail below with reference to drawings. In the following explanation, first, key terms used in this disclosure are described.

In the following discussion, a great amount of concrete details are provided to help thoroughly understand the present invention. However, it is apparent to those of ordinary skill in the art that even though there are no such concrete details, the understanding of the present invention would not be influenced. In addition, it should be further appreciated that any specific terms used below are only for the convenience of description, and thus the present invention should not be limited to only use in any specific applications represented and/or implied by such terms.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
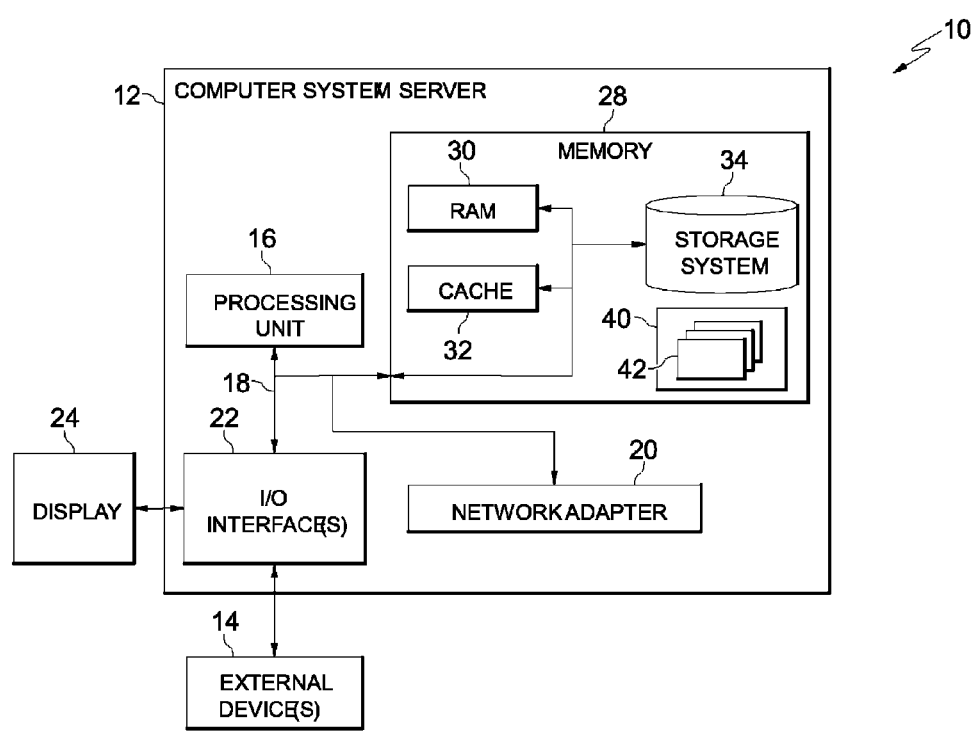
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
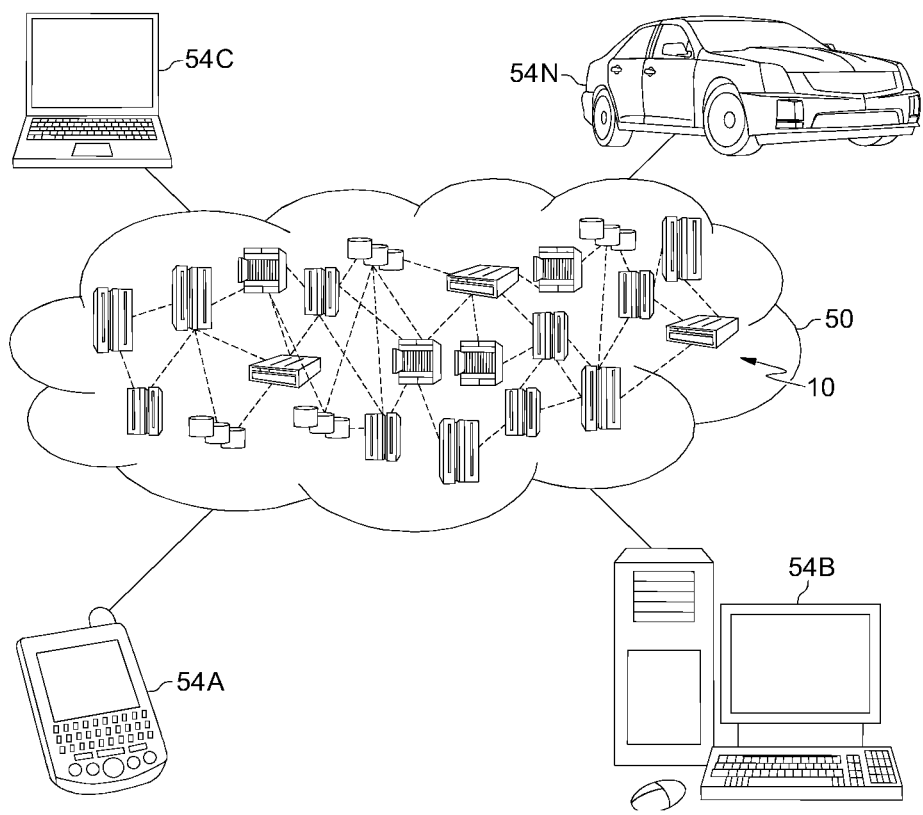
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
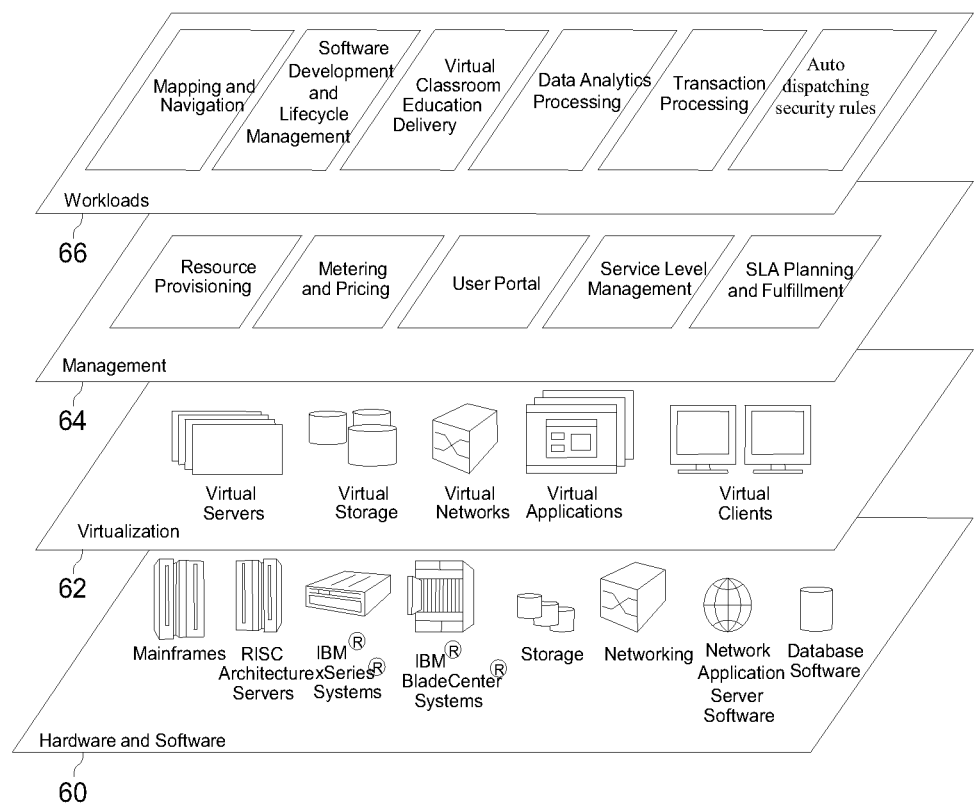
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automatically dispatching security rules.

Figure 2:
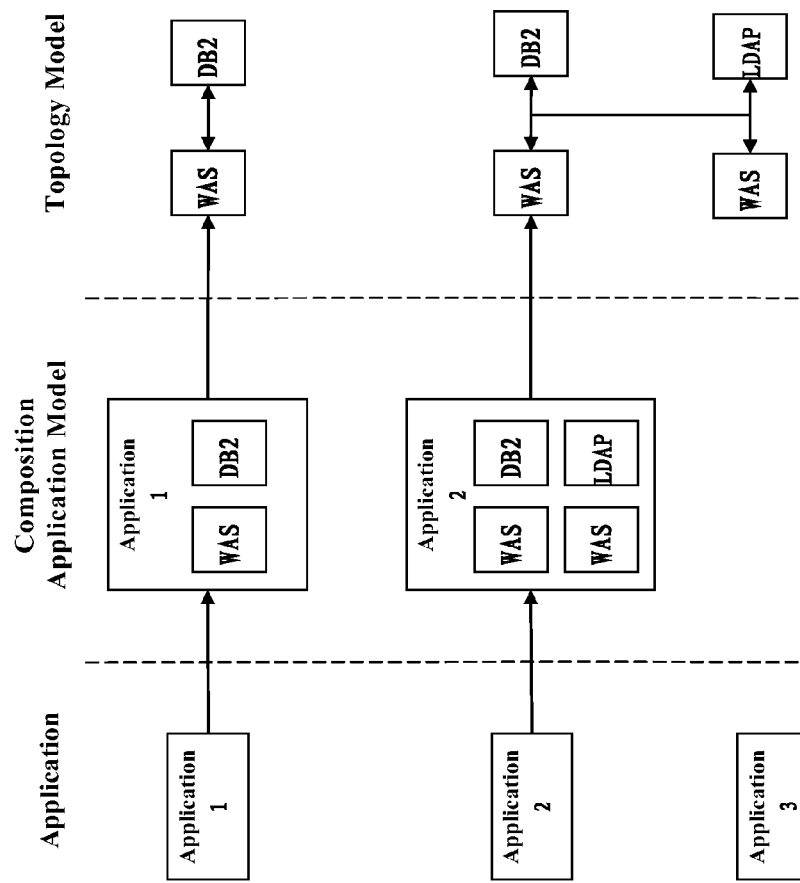
FIG. 2 is an explanatory view schematically illustrating the mapping relationship among applications, composition application model and topology model.

FIG. 2 is an explanatory view schematically illustrating the mapping relationship among applications, composition application model and topology model. Referring to the left part of FIG. 2, an application means an application that is deployed in cloud environment but seems to be one and the same application to a user, such as Sales Force Automation (SFA), Customer Relationship Management (CRM), etc. For an application, different composition application models may be formed. For example, referring to the middle part of FIG. 2, for application 1, as the composition application model, one Web application server (WAS) and one DB2 server are particularly used; whereas for application 2, as the composition application model, two Web application servers, one DB2 server and one LDAP server are particularly used. In a composition application model, an application is mapped to different Web application servers. Lastly, referring to the right part of FIG. 2, based on the created composition application model, a topology model is generated. The topology model provides mapping from the composition application model to a plurality of running server instances. Specifically, the topology model may contain IP addresses of servers where said plurality of running server instances are located and/or connection relationship therebetween.

Figure 3:
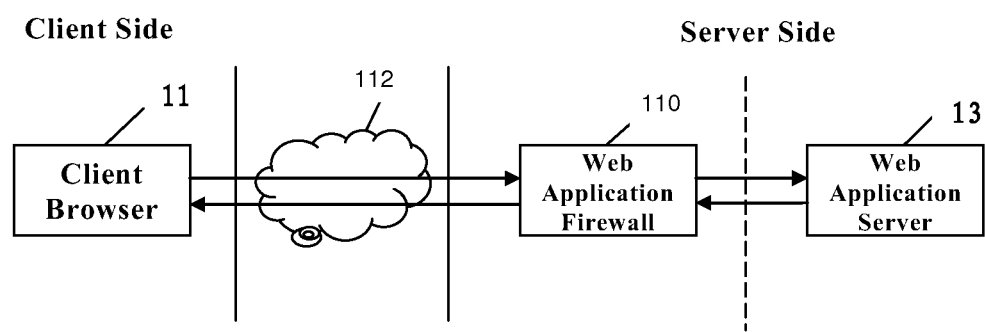
FIG. 3 schematically illustrates the position of an application server firewall in the system.

Next, how an application server firewall validates a user's input utilizing security rules will be briefly described with reference to FIG. 3. FIG. 3 schematically illustrates the position of an application server firewall in the system. In order to simply the explanation, FIG. 3 shows only one Web application server 13 in cloud environment. Other Web application servers in the cloud environment have similar connection relationships.

Reference number 11 denotes a client browser on the client side that is used to send user's HTTP request to the Web application server or receive a corresponding response from the Web application server. Reference number 12 denotes a network through which the Web application server responds to the request sent by the user through the client browser. Reference number 10 denotes a Web application firewall on the Web application server side that is used to validate input value in the user's HTTP request on the server side and to provide security protection for the Web application server. While in FIG. 3, the Web application firewall 10 and the Web application server 13 are separately shown, in fact, they may be in the same hardware server.

As shown in FIG. 3, the user sends a request with an input value to the Web application server 13 by the client browser 11 on the client side via the network 112. In order to avoid the scripting attack, user's input value is required to be validated to ensure the security of the Web application. A normal user will not enter a malicious value on the client side such as logic code (e.g. JavaScript logic), but a potential malicious user will inject malicious logic code into the Web application server 13 to attempt to attack the server, steal other users' private information, etc. When these malicious codes such as JavaScript are sent to browsers of other clients by the server, they will steal sensitive information in the clients.

Therefore, the Web application firewall 110 should be configured on the server side by utilizing predefined security rules, and the Web application firewall 110 validates the user's input value based on these security rules. When the Web application firewall 110 detects a user's input value that violates security rules, it takes appropriate security protection measures against the user to eliminate potential hidden dangers. When the Web application firewall 110 does not find user's input value that violates security rules, the user's request is forwarded to the Web application server 13 for processing. Therefore, here, the Web application firewall 10 functions as a filter.

In order to facilitate the explanation of security rules, FIG. 4 illustrates an example of an HTTP request. The HTTP request includes a method "POST", a URL template, a version, a Header and a Body. The Header of the HTTP request contains parameters in the form of name-value pair, such as Host:9.186.54.51:8080 and Content-length:19, etc.

A simple security rule written in JSON syntax is illustrated below.

```
"Rule":[{    "_id_": "R01",                        //Rule ID
             "name": "Rule01",                     // Rule Name
             "description": "A rule for checking content length", //Notes
             "Severity" : "Medium",                //Security level
             "condition" : {
                 "description": "content length condition",   //Notes
                 "value"    :    "STR.Length(Request.Header.Parameter[    "Content-
                                 Length"]) >100"      //Conditional statement
},
             "action" : [ {"actionType" : "Log"}]       //Logging when conditions
                                                       //are satisfied
}]
```

The function of the security rule is: when the number of bits of the string of value of the parameter "Content-length" in the header of the HTTP request is more than 100, the request is recorded in a log. The security rule may be written in JSON or other syntax, or may be written in a table or a simple text file, as long as it can express judgment of conditions and actions taken according to the condition judgment. For example, another security rule may be recorded as Table 1:

TABLE 1

| Condition | "URI /testresult.html; name ^[a-zA-Z0-9\s.\-]*$; age ^[0-9]+$"; |
|---|---|
| Action | "ACTIONTYPE= deny" |
| Parameter | "ID=050000, SEVERITY=2" |

The security rule specifies input values permitted in fields of "name" and "age". For example, input values permitted in the "name" field are defined by a regular expression "safe text" in the following Table 2; input values permitted in the "age" field are defined by a regular expression representing positive integers. If input values in the "name" or "age" fields do not comply with (violate) corresponding security rules, the HTTP request will be denied.

A regular expression describes a feature by using a "string", then checks whether another "string" complies with the feature. Table 2 lists several examples of regular expressions.

TABLE 2

| Alias | Regular Expression |
|---|---|
| safe text | ^[a-zA-Z0-9\s.\-]*$ |
| email | ^[\w-]+(?:\.[\w-]+)*@(?:[\w-]+\.)+[a-zA-Z]{2,7}$ |
| integer | (-\|+)?[0-9]+ |
| XSS inject | /((\%3C)\|<)((\%2F)\|\/)*[a-z0-9\%]+((\%3E)\|>)/ix |
| SQL inject | /\w*((\%27)\|(\'))((\%6F)\|o\|(\%4F))((\%72)\|r\|(\%52))/ix |

As described above, the Web application firewall validates user's input value according to set security rules and takes corresponding actions.

Figure 5:
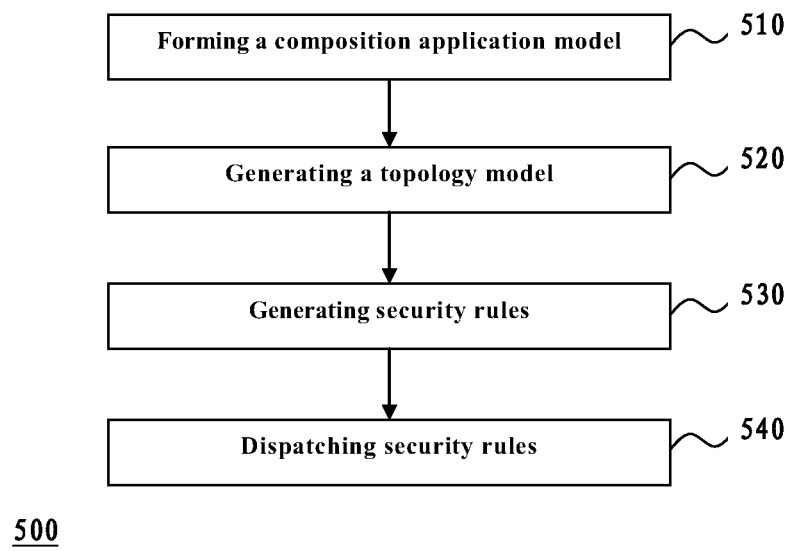
FIG. 5 is a flowchart illustrating a method flow 500 according to an embodiment of the present invention.

Referring to FIG. 5, the present invention provides a non-intrusive method for automatically dispatching security rules in cloud environment. The method is executed at a console (not shown in FIG. 1) in the cloud environment. The console is used for a centralized control of the cloud environment. FIG. 5 is a flowchart illustrating a method flow 500 according to an embodiment of the present invention. The method flow 500 comprises the following steps:

Step 510: forming a composition application model.
Step 520: generating a topology model.
Step 530: generating security rules.
Step 540: dispatching security rules.

Each step in the method flow 500 is described in detail below.

Step 510: Forming a Composition Application Model

In step 510, a composition application model of an application in cloud environment is formed, the composition application model includes at least types of various servers on which the application is deployed.

In build time, at the console used for a centralized control, the composition application model is formed based on various servers configured to form the application. For the application 2 illustrated in FIG. 2, the composition application model may be of the following from of Table 3.

TABLE 3

| Application Name | Server ID | Server Name | Server Type |
|---|---|---|---|
| Application 2 | 1 | WAS1 | WAS |
| Application 2 | 2 | WAS2 | WAS |
| Application 2 | 3 | Mydb | DB2 |
| Application 2 | 4 | User Registry | TDS |

In Table 3, DB2 is a kind of well known database. TDS (Tivoli Directory Server) is an implementation of LDAP (Lightweight Directory Access Protocol) by IBM, and it can be installed and configured across platforms. Although an example of the composition application model is given in a form of table, the present invention is not limited thereto. A JSON file or other files may also be used to describe the composition application model. In Table 3, the column "Server ID" and the column "Server Name" are optional. In terms of the present invention, it is enough if types of all the components that implement the application are known.

Step 520: Generating a Topology Model

In step 520, a topology model of the various servers in the cloud environment is generated.

The application 2 illustrated in FIG. 2 is still taken as an example. In the deployment, respective components in the composition application model are deployed to real servers so that IP addresses of respective servers are obtained and theses IP addresses are recorded in Table 4, for example.

TABLE 4

| Application Name | Server ID | Server Name | Server IP |
|---|---|---|---|
| Application 2 | 1 | WAS1 | 9.186.110.43 |
| Application 2 | 2 | WAS2 | 9.186.110.2 |
| Application 2 | 3 | Mydb | 9.186.110.43 |
| Application 2 | 4 | User Registry | 9.186.110.37 |

As is seen from Table 4, even if the server WAS2 and the server Mydb are two servers of different types, in the deployment, they may be deployed to the same server with the IP "9.186.110.43". Similar to the composition application model, although an example of the topology model is given in a form of table, the present invention is not limited thereto. A JSON file or other files may also be used to describe the topology model. In Table 4, the topology model includes at least IP addresses of respective servers.

Step 530: Generating Security Rules

In step 530, based on the application context of the application, the composition application model and the topology model, security rules to be adopted by the server-side firewalls of respective servers are automatically generated.

Here, the application context of the application is included in struts.xml or web.xml file, for example. Of course, the application context may also be included in a user-defined file or other data structures. The following is a segment of the struts.xml file.

```
<action name="file/*/shares" class="com.ibm.filer.FileShares">
<param name="fileId">{1}</param>
<result>/filer/api/shares.jsp</result>
```

```
<result name="OK_CREATED" type="http">
<param name="location">/filer/api/details.jsp</param>
<param name="status">201</param>
</result>
</action>
```

The first two lines in the segment indicate that, for the HTTP request that requests the resource "file/*/shares" in the server, a corresponding class is called to process the user request.

Regarding a request message that is the object restrained by security rules, the URI of the message needs to be set. Based on the application context of the application such as the above-mentioned struts.xml file of the application deployed in the cloud platform, the message URI: file/{fileID}/shares can be obtained. Here, only an example is given, and the message URI may also be extracted from other <action></action> segment in the struts.xml file.

Now, we have collected the message URI, the composition application model and the topology model. In the following, how to generate security rules based on the collected information is described by taking the application 2 illustrated in FIG. 2 as an example.

According to the composition application model, what containers or servers are used in the cloud environment may be automatically recognized. Since, in addition to the Web application server, DB2 and TDS are included in the column "Server Type" of the composition application model in Table 3, it means that security rules against SQL injection and LDAP injection need to be generated, wherein SQL injection is targeted at the DB2 server and LDAP injection is targeted at the TDS server. For example, security rules written in JSON syntax may be automatically generated as follows:

```
"Rule":[{      "_id_": " SQL-I",                              //Rule ID
               "name": " SQL-I ",                             //Rule Name
               "description": "A rule for checking SQL-I attack",  //Notes
        "severity": "HIGH",                                    //Security level
        "condition" : { "description": "SQL-I attack signature",  //Conditional statement
           "value":   "SIG.MATCH(\"\\b(?:s(?:chemaname|ys(?:cat\\.|tem_user|ibm\\.
                      sys\\w{1,10})|elect. {1,100}\\b(?:(?:char|ascii|int)\\s*\\
                      (|(?:top|(?:count|length)\\s*\\( )" },
           "action" : [{"actionType" : "Log"}                  //Logging when conditions are
                                                                //satisfied
                       {"actionType" : "Block"}]               //And blocking IP
}]
"Rule":[{      "_id_":"LDAPINJECTION",                         //Rule ID
               "name": " LDAPINJECTION ",                      //Rule Name
               "description":"LDAPINJECTION",                  //Notes
               "severity": "MEDIUM",                           //Security level
               "condition":{                                   //Conditional statement
               "value":"SIG.MATCH(\""(?:\((?:\W*?(?:objectc(?:ategory|lass)|homedirectory|[")"},
               "action":[{"actiontype":"Block"},               //Blocking IP when
                                                                //conditions are satisfied
                         {"actiontype":"Log"}]                 //And Logging
}]
``` wherein the security rule "SQL-I" is used against SQL injection to protect the DB2 server from the scripting attack; the security rule "LDAPINJECTION" is used against LDAP injection to protect the TDS server from the scripting attack.

Next, according to the IP addresses 9.186.110.43 and 9.186.110.2 obtained from the topology model as well as the message URI: file/{fileID}/shares obtained as described above, the request message URI that is the object restrained by security rules and its binding relationship with security rules may be determined, as shown in the following Table 5.

TABLE 5

| Message URI | Bound Security Rules |
| --- | --- |
| http:// 9.186.110.43/ file/{fileID}/shares | SQL-I, LDAPINJECTION |
| http:// 9.186.110.2/ file/{fileID}/shares | SQL-I, LDAPINJECTION |

Similar to the above-described composition application model and topology model, although an example of the binding relationship is given in a form of table, the present invention is not limited thereto. A JSON file or other files may also be used to describe the binding relationship.

Here, the "severity" in the above-described security rules is explained. The severity name-value pair is optional and predefined. Automatically generation of security rules to be adopted by the server-side firewalls of respective servers may also be based on the severity input by the user. In one embodiment, the severity may be HIGH, MEDIUM and LOW. In other embodiments, there may be 2 severities or more than 3 severities. When a user selects the severity LOW, only security rules with severity LOW are bound; when a user selects the severity MEDIUM, only security rules with severities MEDIUM and LOW are bound; when a user selects the severity HIGH, security rules with all severities are bound. Therefore, it is possible to generate security rules and binding relationships thereof according to different user preferences.

Step 540: Dispatching Security Rules

In step 540, based on the composition application model and topology model, the security rules are dispatched to each server-side firewall.

First, judgment is made as to which servers are Web application servers, because security rules are only applicable to protect Web application firewalls of Web application servers. Then, IP addresses of respective Web application servers are determined according to the topology model. Specifically, taking the above-described Tables 3 and 4 as examples, it can be determined from the column "Type" in Table 3 that WAS1 and WAS2 are Web application servers, and it can be determined from Table 4 that IP addresses of WAS1 and WAS2 are 9.186.110.43 and 9.186.110.2, respectively. According to this, the above-described generated security rules and their binding relationships with the message URIs are dispatched to the determined IP addresses. For example, the dispatching is to send a file/message containing security rules and their binding relationships with the message URIs to corresponding IP addresses or to store in a corresponding directory. The security rules are used by the server-side firewalls to validate user's input with respect to servers protected by the server-side firewalls.

Here, it is noted that because a Web application server and its Web application firewall are generally deployed to the same hardware server, they share the same IP address. Therefore, it can be deemed that if the IP address of a Web application server is determined, the IP address of its Web application firewall is also determined.

Figure 6:
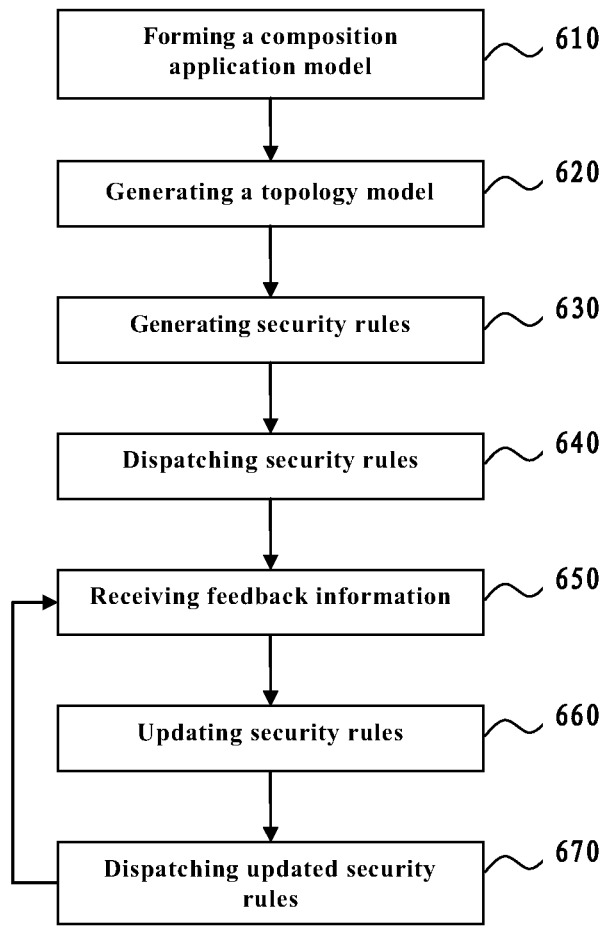
FIG. 6 illustrates a method flow 600 according to another embodiment of the present invention.

FIG. 6 illustrates a method flow 600 according to another embodiment of the present invention. In the method flow 600, steps 610-640 are similar to the above-described steps 510-540, and explanation of those steps are not repeated here. In step 650, feedback information about security rule violations or exceptions is received from respective server-side firewalls. For example, the feedback information may comprise information that may be conceived of by those skilled in the art, such as a log regarding security rule violations, novel attacks, server malfunctions, etc.

In step 660, based on the feedback information, the security rules are updated. Updating the security rules based on the feedback information comprises: newly forming a composition application model of the application in a cloud environment and generating a topology model of the various servers in the cloud environment based on the feedback information; and based on the feedback information, the application context of the application, newly formed composition application model and newly generated topology model, updating the security rules.

Here, in order to facilitate explanation, taking the application 2 in FIG. 2 as an example. It is assumed that the feedback information shows that the server "User Registry" is disconnected from the network, then, in a manner similar to the description of FIG. 5, a composition application model (Table 6) and a topology model (Table 7) are newly formed, as shown below.

TABLE 6

| Application Name | Server ID | Server Name | Server Type |
| --- | --- | --- | --- |
| Application 2 | 1 | WAS1 | WAS |
| Application 2 | 2 | WAS2 | WAS |
| Application 2 | 3 | Mydb | DB2 |

TABLE 7

| Application Name | Server ID | Server Name | Server IP |
| --- | --- | --- | --- |
| Application 2 | 1 | WAS1 | 9.186.110.43 |
| Application 2 | 2 | WAS2 | 9.186.110.2 |
| Application 2 | 3 | Mydb | 9.186.110.43 |

Then, only the security rule "SQL-I" is generated based on above, whereas the security rule "LDAPINJECTION" is not generated any more. This is because the TDS server does not exist so that there will not be affected by LDAP injection. Accordingly, the new binding relationship becomes:

TABLE 8

| Message URI | Bound Security Rules |
| --- | --- |
| http:// 9.186.110.43/ file/{fileID}/shares | SQL-I |
| http:// 9.186.110.2/ file/{fileID}/shares | SQL-I |

In step 670, updated security rules are dispatched to each server-side firewall. Here, similar to step 540, security rules and their binding relationships with the message URIs after the updating are dispatched to the determined IP addresses. In the above example, only the security rule "SQL-I" and the binding relationship in Table 8 are dispatched to the determined IP addresses 9.186.110.43 and 9.186.110.2.

Then, the process returns to step 650, and the processes in steps 650-670 are repeated. In this way, it is possible to adapt generated security rules to diverse and dynamic topology structures in the cloud environment.

In one embodiment, in response to reception of the feedback information from any server, the security rules are updated. In another embodiment, after reception of feedback information, security rules are not updated immediately but updated periodically so as to avoid too frequent updating of security rules.

In one embodiment, it is possible to set default security rules for one or more applications in the cloud environment, and a device that automatically generating security rules to be adopted by the server-side firewalls of respective servers comprises modifying the default security rules. For example, it is possible to set the security rule "Rule01" as described above as the default security rule of application 1 and application 2 illustrated in FIG. 2. Then, regarding application 2, security rules "SQL-I" and "LDAPINJECTION" are generated according to the method shown in FIG. 5. Lastly, the three security rules and the binding relationships with the message URIs thereof are together dispatched to each server-side firewall. By providing default security rules, it is possible to enable a user to set desired specific security rules in a free way.

Figure 7:
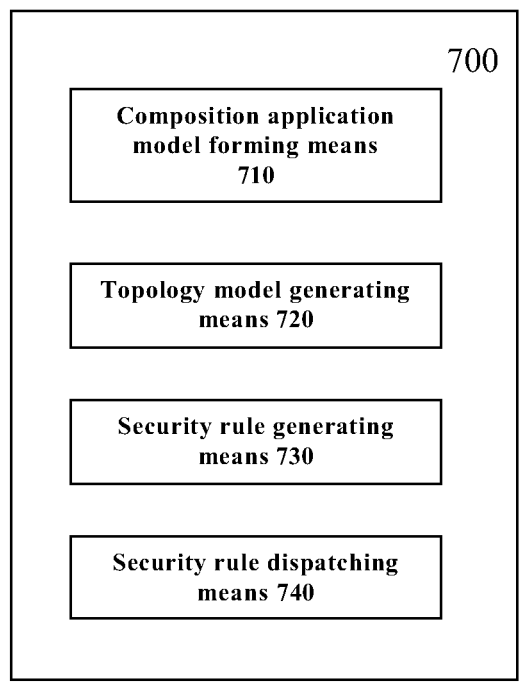
FIG. 7 is a block diagram illustrating a non-intrusive apparatus 700 for automatically dispatching security rules in cloud environment according to an embodiment of the present invention.

FIG. 7 is a block diagram illustrating a non-intrusive apparatus 700 for automatically dispatching security rules in cloud environment according to an embodiment of the present invention.

The apparatus 700 of the present invention comprises: a composition application model forming means 710, for forming a composition application model of an application in the cloud environment, the composition application model including at least types of various servers for deploying the application; a topology model generating means 720, for generating a topology model of the various servers in the cloud environment; a security rule generating means 730, for automatically generating security rules to be adopted by the server-side firewalls of respective servers based on the application context of the application, the composition application model and the topology model; and a security rule dispatching means 740, for dispatching the security rules to each server-side firewall based on the composition application model and topology model.

In one embodiment, the apparatus 700 of the present invention further comprises: a receiving means, for receiving feedback information about security rule violations or exceptions from respective server-side firewalls; an updating means, for updating the security rules based on the feedback information; and a re-dispatching device, for dispatching updated security rules to each server-side firewall.

In one embodiment, the updating means comprises: a reconstructing means, for newly forming a composition application model of the application in cloud environment and generating a topology model of the various servers in the cloud environment based on the feedback information; and a second updating means, for updating the security rules based on the feedback information, the application context of the application, newly formed composition application model and newly generated topology model.

In one embodiment, the apparatus 700 of the present invention further comprises a setting means that sets default security rules for the application, and wherein the security rule generating means comprises a modifying means that modifies the default security rules.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium supporting for example the Internet or Intranet, or a magnetic storage device. Note that the computer usable or computer readable medium even may be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer usable or computer readable storage medium may be any medium that contains, stores, communicates, propagates, or transmits a program for use by or in connection with an instruction execution system, apparatus, or device. A computer useable medium may include a data signal with computer usable program code embodied therein, propagated in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

What is claimed is:

1. A non-intrusive method for automatically dispatching a plurality of security rules in a cloud environment, comprising:
    forming a composition application model of an application in the cloud environment, wherein said composition application model comprises various servers for deploying said application;
    generating a topology model of said various servers in the cloud environment;
    automatically generating a plurality of security rules to be adopted by a plurality of server-side firewalls for respective various servers based on an application context of the following: (i) said application, (ii) said composition application model, (iii) and said topology model;
    dispatching said plurality of security rules to each server-side firewall based on said composition application model and said topology model, and
    receiving feedback information about a plurality of either security rule violations or exceptions from the plurality of server-side firewalls;
    updating said plurality of security rules based on said feedback information; and
    dispatching a plurality of updated security rules to each server-side firewall;
        wherein the application context of said application is included in either file struts.xml or file web.xml and;
        wherein automatically generating the plurality of security rules to be adopted by the plurality of server-side firewalls for the respective various servers is based on a severity input.

2. The method according to claim 1, wherein said plurality of security rules are used by said plurality of server-side firewalls to validate a user's input with respect to various servers protected by the plurality of server-side firewalls.

3. The method according to claim 1, wherein updating said plurality of security rules is performed periodically.

4. The method according to claim 1, wherein updating said plurality of security rules based on said feedback information comprises:
    forming a new composition application model of said application in the cloud environment;
    generating a new topology model of said various servers in the cloud environment based on said feedback information; and
    updating said plurality of security rules based on said feedback information, wherein the application context of said application is based on the new composition application model and the new topology model.

5. The method according to claim 1, wherein said topology model contains at least one Internet Protocol (IP) address for the various servers.

6. The method according to claim 1, further comprising: setting a plurality default security rules for said application; and modifying said plurality of default security rules when automatically generating the plurality of security rules to be adopted by the plurality of server-side firewalls of respective various servers.

7. A non-intrusive apparatus for automatically dispatching a plurality of security rules in a cloud environment, comprising:
    a memory storage device for storing instructions;
    a processor device running said stored instructions to configure said processor device to:
    form a composition application model of an application in the cloud environment,
        wherein said composition application model comprises various servers for deploying said application;
    generate a topology model of said various servers in the cloud environment;
    automatically generate a plurality: of security rules to be adopted by a plurality of server-side firewalls for respective various servers based on the following: (i) the application context of said application, (ii) said composition application model, and (iii) said topology model;

distribute said plurality of security rules to each server-side firewall based on said composition application model and topology model receive feedback information about a plurality of security rule violations or exceptions from server-side firewalls;

update said plurality of security rules based on said feedback information; and dispatching a plurality of updated security rules to each server-side firewall;

wherein application context of said application is included in either file struts.xml or file web.xml and;

wherein automatically generating the plurality of security rules to be adopted by the plurality of server-side firewalls for the respective various servers is based on a severity input.

8. The apparatus according to claim 7, wherein said plurality of security rules are used by said plurality of server-side firewalls to validate a user's input with respect to the various servers protected by the plurality of server-side firewalls.

9. The apparatus according to claim 7, wherein updating said plurality of security rules is performed periodically.

10. The apparatus according to claim 7, wherein to update, said processor device is further configured of said updating means comprises:

form a new composition application model of said application in the cloud environment and generate a new topology model of said various servers in the cloud environment based on said feedback information; and update said plurality of security rules based on said feedback information, wherein the application context of said application is based on the new composition application model and the new topology model.

11. The apparatus according to claim 7, wherein said topology model comprises at least one IP address for the respective various servers.

12. The apparatus according to claim 7, wherein said processor device is further configured to;

set a plurality of default security rules for said application; and modify said plurality of default security rules when generating a plurality of security rules to be adopted by the plurality of server-side firewalls for the respective various servers.

13. A computer readable non-transitory article of manufacture tangibly embodying computer readable instructions which, when executed, cause a computer to carry out the steps of a method comprising:

forming a composition application model of an application in the cloud environment, wherein said composition application model comprises various servers for deploying said application;

generating a topology model of said various servers in the cloud environment;

automatically generating a plurality of security rules to be adopted by a plurality of server-side firewalls for respective various servers based on an application context of the following: (i) said application, (ii) said composition application model, (iii) and said topology model;

dispatching said plurality of security rules to each server-side-firewall based on said composition application model and said topology model, and receiving feedback information about a plurality of either security rule violations or exceptions from the plurality of server-side firewalls;

updating said plurality of security rules based on said feedback information; and dispatching a plurality of updated security rules to each server-side firewall;

wherein the application context of said application is included in either file struts.xml or file web.xml and;

wherein automatically generating the plurality of security rules to be adopted by the plurality of server-side firewalls for the respective various servers is based on a severity input.

14. The method according to claim 1, wherein said topology model provides a mapping from the composition application model to a plurality of running server instances.

* * * * *